(12) United States Patent
News et al.

(10) Patent No.: US 7,482,406 B2
(45) Date of Patent: Jan. 27, 2009

(54) IMPACT RESISTANT POLYOLEFIN COMPOSITIONS

(75) Inventors: Jean News, Ferrara (IT); Paola Massari, Ferrara (IT); Hans-Jürgen Zimmermann, Hofheim am Taunus (DE)

(73) Assignee: Basell Poliolefine Italia s.r.l., Milan (IT)

( * ) Notice: Subject to any disclaimer, the term of this patent is extended or adjusted under 35 U.S.C. 154(b) by 460 days.

(21) Appl. No.: 10/551,682

(22) PCT Filed: Mar. 29, 2004

(86) PCT No.: PCT/EP2004/003307

§ 371 (c)(1),
(2), (4) Date: Sep. 29, 2005

(87) PCT Pub. No.: WO2004/087807

PCT Pub. Date: Oct. 14, 2004

(65) Prior Publication Data

US 2007/0010625 A1    Jan. 11, 2007

(30) Foreign Application Priority Data

Apr. 3, 2003    (EP) .................. 03007669

(51) Int. Cl.
*C08L 23/14*    (2006.01)
*C08F 297/08*    (2006.01)
*C08F 4/649*    (2006.01)

(52) U.S. Cl. .................. 525/240; 525/53; 525/270; 526/125.6; 526/905

(58) Field of Classification Search .................. 525/240, 525/270, 53; 526/125.6, 905
See application file for complete search history.

(56) References Cited

U.S. PATENT DOCUMENTS

| | | | |
|---|---|---|---|
| 3,200,173 A | 8/1965 | Schilling | 260/878 |
| 3,629,368 A | 12/1971 | Fukuda et al. | 260/878 B |
| 3,670,053 A | 6/1972 | Sennari et al. | 260/878 B |
| 4,298,718 A | 11/1981 | Mayr et al. | 526/125 |
| 4,399,054 A | 8/1983 | Ferraris et al. | 252/429 B |
| 4,469,648 A | 9/1984 | Ferraris et al. | 264/9 |
| 4,495,338 A | 1/1985 | Mayr et al. | 526/125 |
| 4,521,566 A | 6/1985 | Galli et al. | 525/247 |
| 5,145,819 A | 9/1992 | Winter et al. | 502/117 |
| 5,324,800 A | 6/1994 | Welborn, Jr. et al. | 526/160 |
| 5,536,789 A | 7/1996 | Schwager et al. | 525/322 |
| 5,541,260 A * | 7/1996 | Pelliconi et al. | 525/240 |
| 6,313,227 B1 | 11/2001 | Tanaka et al. | 525/240 |

FOREIGN PATENT DOCUMENTS

| | | |
|---|---|---|
| EP | 0077532 | 4/1983 |
| EP | 0129368 | 12/1984 |
| EP | 0361493 | 4/1990 |
| EP | 0416815 | 3/1991 |
| EP | 0420436 | 4/1991 |
| EP | 0485823 | 5/1992 |
| EP | 0643066 | 3/1995 |
| EP | 0671404 | 9/1995 |
| EP | 0728769 | 8/1996 |
| EP | 0782587 | 7/1997 |
| EP | 1195385 | 4/2002 |
| WO | 9104257 | 4/1991 |
| WO | 0063261 | 10/2000 |
| WO | 0157099 | 8/2001 |
| WO | 0230998 | 4/2002 |

OTHER PUBLICATIONS

Y. Inoue et al., "Studies of the stereospecific polymerization mechanism of propylene by a modified Ziegler-Natta catalyst based on 125 M Hz $^{13}$C n.m.r. spectra," *Polymer*, vol. 25, p. 1640-1644 (1984).

R. Chujo et al., "Two-site model analysis of $^{13}$C n.m.r. of polypropylene polymerized by Ziegler-Natta catalyst with external alkoxysilane donors," *Polymer*, vol. 35(2), p. 339-342 (1994).

* cited by examiner

*Primary Examiner*—Fred M Teskin
(74) *Attorney, Agent, or Firm*—Jarrod N. Raphael

(57) ABSTRACT

Olefin polymer composition comprising (by weight, unless otherwise specified): A) 60-95% of a propylene homopolymer or copoloymer having a Polydispersity Index (P.I.) value of from 4.6 to 10 and a content of isotactic pentads (mmmm), measured by 13C NMR on the fraction insoluble in xylene at 25° C., higher than 98 molar, B) 5-40% of a copolymer of ethylene containing from 40% to 70% of propylene or $C_4$-$C_{10}$ α-olefins) or of combinations thereof, and optionally minor proportions of a diene; said composition having a Temperature Rising Elution Fractionation (TREF) profile, obtained by fractionation in xylene and collection of fractions at temperatures of 40° C., 80° C. and 90° C., in which the ethylene content Y of the fraction collected at 90° C. satisfies the following relation (1): $Y \leq -0.8 + 0.035X + 0.0091X_2$ wherein X is the ethylene content of the fraction collected at 40° C. and both X and Y are expressed in percent by weight, and a value of intrinsic viscosity [η] of the fraction soluble in xylene at 25° C. of from 1.8 to 4.2 dl/g.

7 Claims, No Drawings

IMPACT RESISTANT POLYOLEFIN COMPOSITIONS

The present invention concerns impact resistant polyolefin compositions and the process for their preparation.

As is known, isotactic polypropylene, though being endowed with an exceptional combination of excellent properties, is affected by the drawback of insufficient impact resistance at relatively low temperatures.

According to the teachings of the prior art, it is possible to obviate this drawback, without sensibly affecting the other polymer properties, by modifying the synthesis process or by blending with rubbers.

The modification of the synthesis process comprises, after polymerizing propylene to isotactic polymer, copolymerizing ethylene and propylene mixtures in the presence of the isotactic polymer. Processes and compositions representative of the prior art are described in U.S. Pat. Nos. 3,200,173, 3,629,368, and 3,670,053, European patent application No. 0077532, and U.S. Pat. No. 6,313,227.

It has now been found that it is possible to obtain polypropylene compositions with a particularly advantageous balance of properties, in particular of high rigidity and good impact resistance, by operating in two polymerization stages. In the first stage propylene is polymerized or copolymerized with minor amounts of comonomer(s), and in the second stage ethylene/α-olefin(s) mixtures are copolymerized in the presence of the propylene polymer obtained in the first step.

Thus the present invention relates to an olefin polymer composition comprising (by weight, unless otherwise specified):

A) 60-95%, preferably 65-90%, of a propylene homopolymer, or a copoloymer of propylene containing 3% or less of ethylene or $C_4$-$C_{10}$ α-olefin(s) or of combinations thereof, said homopolymer or copolymer having a Polydispersity Index (P.I.) value of from 4.6 to 10, preferably from 5.1 to 8 and a content of isotactic pentads (mmmm), measured by $^{13}C$ NMR on the fraction insoluble in xylene at 25° C., higher than 98 molar %, preferably from 98.5 to 99.5 molar %;

B) 5-40%, preferably 10-35%, of a copolymer of ethylene containing from 40% to 70%, preferably from 47 to 62%, of propylene or $C_4$-$C_{10}$ α-olefin(s) or of combinations thereof, and optionally minor proportions of a diene; said composition having a Temperature Rising Elution Fractionation (TREF) profile, obtained by fractionation in xylene and collection of fractions at temperatures of 40° C., 80° C. and 90° C., in which the ethylene content Y of the fraction collected at 90° C. satisfies the following relation (I):

$$Y \leq -0.8 + 0.035X + 0.0091X^2$$

wherein X is the ethylene content of the fraction collected at 40° C. and both X and Y are expressed in percent by weight (referred to the respective fractions), and having a value of intrinsic viscosity [η] of the fraction soluble in xylene at 25° C. of from 1.8 to 4.2 dl/g, preferably from 2 to 4.2 dl/g, more preferably from 2.3 to 3.8.

Particularly preferred features of the composition of the present invention are:

a molecular weight distribution in component (A), expressed by the Mw/Mn ratio, measured by GPC, equal to or higher than 7, in particular from 7 to 20;

a value of Mz/Mw ratio in component (A), measured by GPC, equal to or higher than 3.6, in particular from 3.6 to 7;

Flexural Modulus from 900 to 2000 MPa, more preferably from 1100 to 1700 MPa;

Melt Flow Rate (MFR) from 0.5 to 45 g/10 min., more preferably from 2 to 35 g/10 min. (measured under condition L, namely 230° C., 2.16 kg load);

The total quantity of copolymerized ethylene is preferably from 1.5 to 24% by weight. As previously said, the compositions of the present invention can be prepared with a polymerization process comprising at least two stages, where in the first stage the relevant monomer(s) are polymerized to form component (A) and in the following stage(s) the mixtures ethylene-propylene, ethylene-propylene and one or more $C_4$-$C_{10}$ α-olefin(s), ethylene and one or more $C_4$-$C_{10}$ α-olefin(s) and, optionally, a diene, are polymerized to form component (B).

Thus the present invention relates also to a process for preparing the previously said compositions by a sequential polymerization comprising at least two sequential steps, wherein components (A) and (B) are prepared in separate subsequent steps, operating in each step, except the first step, in the presence of the polymer formed and the catalyst used in the preceding step. The catalyst is added only in the first step, however its activity is such that it is still active for all the subsequent steps. The component (A) is preferably prepared in a single polymerization stage. The order of the polymerization stages is not a critical process feature, however component (A) is preferably prepared before component (B).

The polymerization can occur in liquid phase, gas phase or liquid-gas phase.

For example, it is possible to carry out the propylene polymerization stage using liquid propylene as diluent, and the following copolymerization stage in gas phase, without intermediate stages except for the partial degassing of the propylene.

Examples of suitable reactors are continuously operated stirred reactors, loop reactors, fluidized-bed reactors or horizontally or vertically stirred powder bed reactors. Of course, the reaction can also be carried out in a plurality of reactors connected in series.

It is possible to carry out the polymerization in a cascade of stirred gas-phase reactors which are connected in series and in which the pulverulent reaction bed is kept in motion by means of a vertical stirrer. The reaction bed generally comprises the polymer which is polymerized in the respective reactor.

Propylene polymerization to form component (A) can be done in the presence of ethylene and/or one or more $C_4$-$C_{10}$ α-olefin(s), such as for example butene-1, pentene-1,4-methylpentene-1, hexene-1 and octene-1, or combinations thereof.

As previously said, the copolymerization of ethylene with propylene (preferred) and/or other $C_4$-$C_{10}$ α-olefin(s) to form component (B) can occur in the presence of a diene, conjugated or not, such as butadiene, 1,4-hexadiene, 1,5-hexadiene and ethylidene-norbornene-1. The diene, when present, is typically in an amount of from 0.5 to 10% by weight with respect to the weight of (B).

Reaction time, pressure and temperature relative to the polymerization steps are not critical, however it is best if the temperature is from 20 to 150° C., in particular from 50 to 100° C. The pressure can be atmospheric or higher.

The regulation of the molecular weight is carried out by using known regulators, hydrogen in particular.

The compositions of the present invention can also be produced by a gas-phase polymerisation process carried out in at least two interconnected polymerisation zones. The said type of process is illustrated in European patent application 782 587.

In detail, the above-mentioned process comprises feeding one or more monomer(s) to said polymerisation zones in the presence of catalyst under reaction conditions and collecting the polymer product from the said polymerisation zones. In the said process the growing polymer particles flow upward through one (first) of the said polymerisation zones (riser) under fast fluidisation conditions, leave the said riser and enter another (second) polymerisation zone (downcomer) through which they flow downward in a densified form under the action of gravity, leave the said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it becomes possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, preferably from 2 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the polymer circulating between the two polymerisation zones can be effected by metering the amount of polymer leaving the downcomer using means suitable for controlling the flow of solids, such as mechanical valves.

The operating parameters, such as the temperature, are those that are usual in gas-phase olefin polymerisation process, for example from 50 to 120° C.

This process can be carried out under operating pressures of between 0.5 and 10 MPa, preferably from 1.5 to 6 MPa.

Advantageously, one or more inert gases are maintained in the polymerisation zones, in such quantities that the sum of the partial pressure of the inert gases is preferably between 5 and 80% of the total pressure of the gases. The inert gas can be nitrogen or propane, for example.

The various catalysts are fed up to the riser at any point of the said riser. However, they can also be fed at any point of the downcomer. The catalyst can be in any physical state, therefore catalysts in either solid or liquid state can be used.

Preferably the polymerization catalyst is a Ziegler-Natta catalyst comprising a solid catalyst component comprising:

a) Mg, Ti and halogen and an electron donor selected from succinates, preferably from succinates of formula (I) below:

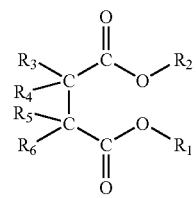

wherein the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to, or different from, each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen $R_6$ is a radical selected from primary branched, secondary or tertiary alkyl groups, cycloalkyl, aryl, arylalkyl or alkylaryl groups having from 3 to 20 carbon atoms, or a linear alkyl group having at least four carbon atoms optionally containing heteroatoms;

b) an alkylaluminum compound and, optionally (but preferably), c) one or more electron-donor compounds (external donor).

Other preferred catalysts are Ziegler-Natta catalysts as above defined, wherein however the solid catalyst component (a) comprises, in addition to the said Mg, Ti and halogen, at least two electron donor compounds, said catalyst component being characterized by the fact that at least one of the electron donor compounds, which is present in an amount from 15 to 50% by mol with respect to the total amount of donors, is selected from esters of succinic acids which are not extractable, under the conditions described below, for more than 20% by mol and at least another electron donor compound which is extractable, under the same conditions, for more than 30% by mol.

The esters of succinic acids not extractable for more than 20% by mol are defined as non-extractable succinates. The electron donor compounds extractable for more than 30% by mol are defined as extractable electron donor compounds. Preferably, the amount of non-extractable succinates is between 20 and 45 and more preferably from 22 to 40% by mol with respect to the total amount of the electron donor compounds. Among the non-extractable succinates mentioned above, particularly preferred are the succinates of formula (II) below:

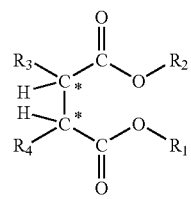

in which the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; and the radicals $R_3$ and $R_4$ equal to, or different from, each other, are $C_1$-$C_{20}$ alkyl, cycloalkyl, aryl, arylalkyl or alkylaryl group, optionally containing heteroatoms with the proviso that at least one of them is a branched alkyl; said compounds being, with respect to the two asymmetric carbon atoms identified in the structure of formula (II), stereoisomers of the type (S,R) or (R,S) that are present in pure forms or in mixtures.

Among the extractable electron donor compounds particularly preferred are the esters of mono or dicarboxylic organic acids such as benzoates, malonates, phthalates and succinates.

Preferred are alkylphthalates.

The extractability test is carried out as follows.

A Preparation of the Solid Catalyst Component

Into a 500 ml four-necked round flask, purged with nitrogen, 250 ml of $TiCl_4$ are introduced at 0° C. While stirring, 10.0 g of microspheroidal $MgCl_2$*$2.8C_2H_5OH$ (prepared according to the method described in ex.2 of U.S. Pat. No. 4,399,054 but operating at 3,000 rpm instead of 10,000) are introduced. 4.4 mMols of the selected electron donor compound are also added.

The temperature is raised to 100° C. and maintained at that temperature for 120 min. Then, the stirring is discontinued, the solid product is allowed to settle and the supernatant liquid is siphoned off.

250 ml of fresh $TiCl_4$ are added. The mixture is reacted at 120° C. for 60 min under stirring and, then, the supernatant liquid is siphoned off. The solid (A) is washed six times with anhydrous hexane (6×100 ml) at 60° C., dried under vacuum and analyzed for the quantitative determination of Mg and electron donor compound. The ratio of the electron donor compound with respect to Mg (ratio A) is thus determined.

B Treatment of Solid A

In a 250 ml jacketed glass reactor with mechanical stirrer and filtration septum are introduced under nitrogen atmosphere 190 ml of anhydrous n-hexane, 19 mMmoles of $AlEt_3$ and 2 gr of the catalyst component prepared as described in A. The mixture is heated at 60° C. for 1 hour under stirring (stirring speed at 400 rpm). After that time the mixture is filtered, washed four times with n-hexane at 60° C. and finally dried under vacuum for 4 hours at 30° C. The solid is then analyzed for the quantitative determination of Mg and electron donor compound. The molar ratio of the electron donor compound with respect to Mg (ratio B) is thus determined.

The extractability of the electron donor compound is calculated according to the following formula: % of ED extracted=(Ratio A-Ratio B)/Ratio A.

Preferred examples of succinates to be used in the above said catalyst components are diethyl 2,3-bis(trimethylsilyl) succinate, diethyl 2,2-sec-butyl-3-methylsuccinate, diethyl 2-(3,3,3-trifluoropropyl)-3-methylsuccinate, diethyl 2,3-bis (2-ethylbutyl)succinate, diethyl 2,3-diethyl-2-isopropylsuccinate, diethyl 2,3-diisopropyl-2-methylsuccinate, diethyl 2,3-dicyclohexyl-2-methylsuccinate, diethyl 2,3-dibenzylsuccinate, diethyl 2,3-diisopropylsuccinate, diethyl 2,3-bis (cyclohexylmethyl)succinate, diethyl 2,3-di-t-butylsuccinate, diethyl 2,3-diisobutylsuccinate, diethyl 2,3-dineopentylsuccinate, diethyl 2,3-diisopentylsuccinate, diethyl 2,3-(1-trifluoromethyl-ethyl)succinate, diethyl 2,3-(9-fluorenyl)succinate, diethyl 2-isopropyl-3-isobutylsuccinate, diethyl 2-t-butyl-3-isopropylsuccinate, diethyl 2-isopropyl-3-cyclohexylsuccinate, diethyl 2-isopentyl-3-cyclohexylsuccinate, diethyl 2-cyclohexyl-3-cyclopentylsuccinate, diethyl 2,2,3,3-tetramethylsuccinate, diethyl 2,2,3,3-tetraethylsuccinate, diethyl 2,2,3,3-tetrapropylsuccinate, diethyl 2,3-diethyl-2,3-diisopropylsuccinate, diisobutyl 2,3-bis(trimethylsilyl)succinate, diisobutyl 2,2-sec-butyl-3-methylsuccinate, diisobutyl 2-(3,3,3-trifluoropropyl)-3-methylsuccinate, diisobutyl 2,3-bis(2-ethylbutyl) succinate, diisobutyl 2,3-diethyl-2-isopropylsuccinate, diisobutyl 2,3-diisopropyl-2-methylsuccinate, diisobutyl 2,3-dicyclohexyl-2-methylsuccinate, diisobutyl 2,3-dibenzylsuccinate, diisobutyl 2,3-diisopropylsuccinate, diisobutyl 2,3-bis(cyclohexylmethyl)succinate, diisobutyl 2,3-di-t-butylsuccinate, diisobutyl 2,3-diisobutylsuccinate, diisobutyl 2,3-dineopentylsuccinate, diisobutyl 2,3-diisopentylsuccinate, diisobutyl 2,3-(1,1,1-trifluoro-2-propyl)succinate, diisobutyl 2,3-n-propylsuccinate, diisobutyl 2,3-(9-fluorenyl)succinate, diisobutyl 2-isopropyl-3-ibutylsuccinate, diisobutyl 2-terbutyl-3-ipropylsuccinate, diisobutyl 2-isopropyl-3-cyclohexylsuccinate, diisobutyl 2-isopentyl-3-cyclohexylsuccinate, diisobutyl 2-n-propyl-3-(cyclohexylmethyl)succinate, diisobutyl 2-cyclohexyl-3-cyclopentylsuccinate, diisobutyl 2,2,3,3-tetramethylsuccinate, diisobutyl 2,2,3,3-tetraethylsuccinate, diisobutyl 2,2,3,3-tetrapropylsuccinate, diisobutyl 2,3-diethyl-2,3-diisopropylsuccinate, dineopentyl 2,3-bis(trimethylsilyl)succinate, dineopentyl 2,2-di-sec-butyl-3-methylsuccinate, dineopentyl 2-(3,3,3-trifluoropropyl)-3-methylsuccinate, dineopentyl 2,3 bis(2-ethylbutyl)succinate, dineopentyl 2,3-diethyl-2-isopropylsuccinate, dineopentyl 2,3-diisopropyl-2-methylsuccinate, dineopentyl 2,3-dicyclohexyl-2-methylsuccinate, dineopentyl 2,3-dibenzylsuccinate, dineopentyl 2,3-diisopropylsuccinate, dineopentyl 2,3-bis(cyclohexylmethyl)succinate, dineopentyl 2,3-di-t-butylsuccinate, dineopentyl 2,3-diisobutylsuccinate, dineopentyl 2,3-dineopentylsuccinate, dineopentyl 2,3-diisopentylsuccinate, dineopentyl 2,3-(1,1,1-trifluoro-2-propyl)succinate, dineopentyl 2,3-n-propylsuccinate, dineopentyl 2,3(9-fluorenyl)succinate, dineopentyl 2-isopropyl-3-isobutylsuccinate, dineopentyl 2-t-butyl-3-isopropylsuccinate, dineopentyl 2-isopropyl-3-cyclohexylsuccinate, dineopentyl 2-isopentyl-3-cyclohexylsuccinate, dineopentyl 2-n-propyl-3-(cyclohexylmethyl)succinate, dineopentyl 2-cyclohexyl-3-cyclopentylsuccinate, dineopentyl 2,2,3,3-tetramethylsuccinate, dineopentyl 2,2,3,3-tetraethylsuccinate, dineopentyl 2,2,3,3-tetrapropylsuccinate, dineopentyl 2,3-diethyl-2,3-diisopropylsuccinate.

Particularly preferred are diethyl 2,3-dibenzylsuccinate, diethyl 2,3-diisopropylsuccinate, diethyl 2,3-bis(cyclohexylmethyl)succinate, diethyl 2,3-diisobutylsuccinate, diethyl 2,3-(1-trifluoromethyl-ethyl)succinate, diisobutyl 2,3-dibenzylsuccinate, diisobutyl 2,3-diisopropylsuccinate, diisobutyl 2,3-bis(cyclohexylmethyl)succinate, diisobutyl 2,3-n-propylsuccinate, dineopentyl 2,3-diethyl-2-isopropylsuccinate, dineopentyl 2,3-diisopropyl-2-methylsuccinate, dineopentyl 2,3-dicyclohexyl-2-methylsuccinate, dineopentyl 2,3-dibenzylsuccinate, dineopentyl 2,3-diisopropylsuccinate, dineopentyl 2,3-bis(cyclohexylmethyl)succinate, dineopentyl 2,3-diisobutylsuccinate, dineopentyl 2,3-n-propylsuccinate, dineopentyl 2-isopropyl-3-cyclohexylsuccinate.

The alkyl-Al compound (b) is preferably selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum compounds with alkylaluminum halides, alkylaluminum hydrides or alkylaluminum sesquichlorides, such as $AlEt_2Cl$ and $Al_2Et_3Cl_3$.

The external donor (c) can be of the same type or it can be different from the succinates of formula (I) and (II). Suitable external electron-donor compounds include silicon compounds, ethers, esters such as phthalates, benzoates, succinates also having a different structure from those of formula (I) or (II), amines, heterocyclic compounds and particularly 2,2,6,6-tetramethylpiperidine, ketones and the 1,3-diethers of the general formula (III):

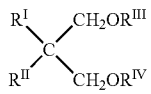

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

A particularly preferred class of external donor compounds is that of silicon compounds of formula $R_a^7 R_b^8 Si(OR^9)_c$, where a and b are integer from 0 to 2, c is an integer from 1 to 3 and the sum (a+b+c) is 4; $R^7$, $R^8$, and $R^9$, are C1-C18 hydrocarbon groups optionally containing heteroatoms. Particularly preferred are the silicon compounds in which a is 1, b is 1, c is 2, at least one of $R^7$ and $R^8$ is selected from branched alkyl, alkenyl, alkylene, cycloalkyl or aryl groups with 3-10 carbon atoms optionally containing heteroatoms and $R^9$ is a $C_1$-$C_{10}$ alkyl group, in particular methyl. Examples of such preferred silicon compounds are cyclohexylmethyldimethoxysilane, diphenyldimethoxysilane, methyl-t-butyldimethoxysilane, dicyclopentyldimethoxysilane, 2-ethylpiperidinyl-2-t-butyldimethoxysilane and (1,1,1-trifluoro-2-propyl)-2-ethylpiperidinyldimethoxysilane, 3,3,3-trifluoropropyl-2-ethylpiperidyl-dimethoxysilane and (1,1,1-trifluoro-2-propyl)-methyldimethoxysilane. Moreover, are also preferred the silicon compounds in which a is 0, c is 3, $R^8$ is a branched alkyl or cycloalkyl group, optionally containing heteroatoms, and $R^9$ is methyl. Examples of such preferred silicon compounds are cyclohexyltrimethoxysilane, t-butyltrimethoxysilane and thexyltrimethoxysilane.

Particularly preferred specific examples of silicon compounds are cyclohexylmethyldimethoxysilane and dicyclopentyldimethoxysilane.

Preferably the electron donor compound (c) is used in such an amount to give a molar ratio between the organoaluminum compound and said electron donor compound (c) of from 0.1 to 500, more preferably from 1 to 300 and in particular from 3 to 100.

As explained above, the solid catalyst component comprises, in addition to the above electron donors, Ti, Mg and halogen. In particular, the catalyst component comprises a titanium compound, having at least a Ti-halogen bond and the above mentioned electron donor compounds supported on a Mg halide. The magnesium halide is preferably $MgCl_2$ in active form, which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that, the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds are $TiCl_4$ and $TiCl_3$; furthermore, also Ti-haloalcoholates of formula $Ti(OR)n$-$yXy$ can be used, where n is the valence of titanium, y is a number between 1 and n, X is halogen and R is a hydrocarbon radical having from 1 to 10 carbon atoms.

The preparation of the solid catalyst component can be carried out according to several methods, well known and described in the art.

According to a preferred method, the solid catalyst component can be prepared by reacting a titanium compound of formula $Ti(OR)n$-$yXy$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles.

Examples of spherical adducts prepared according to this procedure are described in U.S. Pat. Nos. 4,399,054 and 4,469,648. The so obtained adduct can be directly reacted with the Ti compound or it can be previously subjected to thermally controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The electron donor compound(s) can be added during the treatment with $TiCl_4$.

Regardless of the preparation method used, the final amount of the electron donor compound(s) is preferably such that the molar ratio with respect to the $MgCl_2$ is from 0.01 to 1, more preferably from 0.05 to 0.5.

The said catalyst components and catalysts are described in WO 00/63261, WO 01/57099 and WO 02/30998.

Other catalysts that may be used in the process according to the present invention are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts are the so-called constrained geometry catalysts, as described in EP-A-0 416 815 (Dow), EP-A-0 420 436 (Exxon), EP-A-0 671 404, EP-A-0 643 066 and WO 91/04257.

The catalysts can be pre-contacted with small amounts of olefins (prepolymerization).

The compositions of the present invention can also contain additives commonly employed in the art, such as antioxidants, light stabilizers, heat stabilizers, nucleating agents, colorants and fillers.

In particular, the addition of nucleating agents brings about a considerable improvement in important physical-mechanical properties, such as Flexural Modulus, Heat Distortion Temperature (HDT), tensile strength at yield and transparency.

Typical examples of nucleating agents are the p-tert-butyl benzoate and the 1,3- and 2,4-dibenzylidenesorbitols.

The nucleating agents are preferably added to the compositions of the present invention in quantities ranging from 0.05 to 2% by weight, more preferably from 0.1 to 1% by weight with respect to the total weight.

The addition of inorganic fillers, such as talc, calcium carbonate and mineral fibers, also brings about an improvement to some mechanical properties, such as Flexural Modulus and HDT. Talc can also have a nucleating effect.

The particulars are given in the following examples, which are given to illustrate, without limiting, the present invention.

The data relating to the polymeric materials of the examples are determined by way of the methods reported below.

MFR: ASTM D 1238, condition L, 230° C., 2.16 Kg;

intrinsic viscosity [η]: measured in tetrahydronaphthalene at 135° C.;

Mn (number average molecular weight), Mw (weight average molecular weight) and Mz (z average molecular weight): measured by way of gel permeation chromatography (GPC) in 1,2,4-trichlorobenzene; in detail, the samples are prepared at a concentration of 70 mg/50 ml of stabilized 1,2,4 trichlorobenzene (250 μg/ml BHT (CAS REGISTRY NUMBER 128-37-0); the samples are then heated to 170° C. for 2.5 hours to solubilize; the measurements are run on a Waters GPCV2000 at 145° C. at a flow rate of 1.0 ml/min. using the same stabilized solvent; three Polymer Lab columns are used in series (Plgel, 20 μm mixed ALS, 300 X 7.5 mm);

ethylene content: by IR spectroscopy;

Flexural Modulus: ISO 178;

Izod: measured according to the ISO 180/1A method;

Break energy: Basell method 17324 (see below); the same test specimens and testing method as for the determination of the Ductile/Brittle transition temperature (hereinafter described) are used, but in the present case the energy required to break the sample at −20° C. is determined.

Determination of Ductile/Brittle Transition Temperature

Determined according to internal method MA 17324, available upon request.

According to this method, the bi-axial impact resistance is determined through impact with an automatic, computerised striking hammer.

The circular test specimens are obtained by cutting with circular hand punch (38 mm diameter). They are conditioned for at least 12 hours at 23° C. and 50 RH and then placed in a thermostatic bath at testing temperature for 1 hour.

The force-time curve is detected during impact of a striking hammer (5.3 kg, hemispheric punch with a ½" diameter) on a circular specimen resting on a ring support. The machine used is a CEAST 6758/000 type model no. 2.

D/B transition temperature means the temperature at which 50% of the samples undergoes fragile break when submitted to the said impact test.

The Plaques for D/B measurement, having dimensions of 127×127×1.5 mm are prepared according to the following method.

The injection press is a Negri Bossi™ type (NB 90) with a clamping force of 90 tons. The mould is a rectangular plaque (127×127×1.5 mm).

The main process parameters are reported below:

| | |
|---|---|
| Back pressure (bar): | 20 |
| Injection time (s): | 3 |
| Maximum Injection pressure (MPa): | 14 |
| Hydraulic injection pressure (MPa): | 6 – 3 |
| First holding hydraulic pressure (MPa): | 4 ± 2 |
| First holding time (s): | 3 |
| Second holding hydraulic pressure (MPa): | 3 ± 2 |
| Second holding time (s): | 7 |
| Cooling time (s): | 20 |
| Mould temperature (° C.): | 60 |

The melt temperature is between 220 and 280° C.

Determination of Isotactic Pentads Content 50 mg of each xylene insoluble fraction were dissolved in 0.5 IL, of $C_2D_2Cl_4$.

The $^{13}C$ NMR spectra were acquired on a Bruker DPX-400 (100.61 Mhz, 90° pulse, 12 s delay between pulses). About 3000 transients were stored for each spectrum; mmmm pentad peak (21.8 ppm) was used as reference.

The microstructure analysis was carried out as described in literature (*Polymer*, 1984, 25, 1640, by Inoue Y et Al. and *Polymer*, 1994, 35, 339, by Chujo k et Al.).

Polydispersity Index (PI): measurement of molecular weight distribution of the polymer. To determine the PI value, the modulus separation at low modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

$$PI=54.6\times(\text{modulus separation})^{-1.76}$$

wherein the modulus separation (MS) is defined as:

$$MS=(\text{frequency at }G'=500\text{ Pa})/(\text{frequency at }G''=500\text{ Pa})$$

wherein G' is the storage modulus and G" is the loss modulus.

Fractions soluble and insoluble in xylene at 25° C.: 2.5 g of polymer are dissolved in 250 ml of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum a 80° C. until constant weight is reached. Thus one calculates the percent by weight of polymer soluble and insoluble at room temperature (25° C.).

Temperature Raising Elution Fractionation (TREF)

Determined in xylene by using the following method.

The main fractionation vessel consists of a 500 ml double wall reactor. A vibro mixer is introduced from above. The preheated solvent for the extraction process can enter the reactor through a tubing which is situated at the lower outlet of the vessel.

The TREF procedure is started by dissolving 5 g of the polymer in 400 ml boiling xylene, stabilized with 5 g/l 2,6-di-tert-butyl-4-methylphenol. To precipitate the polymer, the solution is cooled down linearly to 25° C. controlled by a thermostat at a cooling rate of 10° C./h.

First Step. The suspension of the crystals is then heated to the first elution temperature (40° C.), the polymer crystals in the apparatus are agitated by the vibromixer and extracted for 15 minutes. Then the polymer in solution is discharged through the lower valve, whereas the remaining polypropylene crystals stay in the extractor. The solution is poured into 800 ml of cold Acetone (Temperature <0° C.) and the eluted polymer is precipitated. The precipitates are filtered on Büchner-funnels (glas frite No.3) and washed with cold Acetone (<0° C.). The isolated polymer fractions are then dried about 4 to 5 hours at 100° C. in vacuo and weighed.

Next Step. The temperature of the extractor is increased to the desired temperature and 400 ml of xylene of the same temperature are introduced into the fractionation vessel. The remaining polymer crystals in the apparatus are then extracted again for 15 minutes. The polymer solution is again discharged, the dissolved polymer precipitated and filtered.

Then this step is repeated again at the following temperature and so on, until approaching 125° C., the boiling point of the solvent. At this temperature the whole polymer should have been extracted.

EXAMPLE 1 AND COMPARATIVE EXAMPLES 1 AND 2

Preparation of the Solid Catalyst Component

Into a 500 mL four-necked round flask, purged with nitrogen, 250 mL of $TiCl_4$ were introduced at 0° C. While stirring, 10.0 g of microspheroidal $MgCl_2*2.8C_2H_5OH$ (prepared according to the method described in ex.2 of U.S. Pat. No. 4,399,054 but operating at 3000 rpm instead of 10000 rpm) and 7.4 mmol of diethyl 2,3-diisopropylsuccinate were added. The temperature was raised to 100° C. and maintained for 120 min. Then, the stirring was discontinued, the solid product was allowed to settle and the supernatant liquid was siphoned off. Then 250 mL of fresh $TiCl_4$ were added. The mixture was reacted at 120° C. for 60 min and, then, the supernatant liquid was siphoned off. The solid was washed six times with anhydrous hexane (6×100 mL) at 60° C.

Catalyst System and Prepolymerization Treatment

Before introducing it into the polymerization reactors, the solid catalyst component described above is contacted at 12° C. for 24 minutes with aluminum triethyl (TEAL) and dicyclopentyldimethoxysilane (DCPMS) in such quantity that the weight ratio of TEAL to the solid catalyst component be equal to 11, and the weight ratio TEAL/DCPMS be equal to 4.4.

The catalyst system is then subjected to prepolymerization by maintaining it in suspension in liquid propylene at 20° C. for about 5 minutes before introducing it into the first polymerization reactor.

Polymerization

The polymerization run is conducted in continuous mode in a series of three reactors equipped with devices to transfer the product from one reactor to the one immediately next to it. The first two reactors are liquid phase reactors, and the third is a fluid bed gas phase reactor. Component (A) is prepared in the first and second reactor, while component (B) is prepared in the third.

Hydrogen is used as molecular weight regulator.

The gas phase (propylene, ethylene and hydrogen) is continuously analyzed via gas-chromatography.

At the end of the run the powder is discharged and dried under a nitrogen flow.

The main polymerization conditions and the analytical data relating to the polymers produced in the three reactors are reported in Table 1.

Then the polymer particles are introduced in a rotating drum, wherein they are mixed with 0.2% by weight of Irganox B 225 (made of about 50% Irganox 1010 and 50% Irgafos 168), 0.3% by weight of GMS90 (glycerin monostearate) and 0.09% by weight of Na benzoate, to obtain a nucleated composition. The previously said Irganox 1010 is pentaerytrityl tetrakis 3-(3,5-di-tert-butyl-4-hydroxyphenyl) propanoate, while Irgafos 168 is tris (2,4-di-tert-butylphenyl)phosphite.

Then the polymer particles are extruded under nitrogen atmosphere in a twin screw extruder, at a rotation speed of 250 rpm and a melt temperature of 200-250° C.

The properties of the so obtained polymer are reported in Table 2. In the same table are also reported the properties of two comparison nucleated polymer compositions (Comp. Examples 1 and 2), having closely comparable MFR, heterophasic structure and composition.

The comparison polymer composition of Comp. Example 1 is made of (all amounts by weight):
A) 83.5% of a propylene homopolymer having MFRL of 33 g/10 min., xylene insoluble content of 98.8% and PI of 4.3;
B) 16.5% of a propylene/ethylene copolymer containing 45% of ethylene; and contains 0.3% of GMS90, 0.12% of Irganox B225 and 0.09% of Na benzoate.

Moreover, the said comparison composition contains 15.3% by weight of fraction soluble in xylene, having an intrinsic viscosity value of 2, and has the following features:
(mmmm) of the xylene-insoluble portion of (A): 99.1% molar;
Mw/Mn of (A): 10.1;
Mz/Mw of (A): 3.5;
Y: 15.1 wt %;
X: 37.7 wt %.

The comparison polymer composition of Comp. Example 2 is made of (all amounts by weight):
A) 82% of a propylene homopolymer having PI of 4.3;
B) 18% of a propylene/ethylene copolymer containing 50% of ethylene; and contains 0.3% of GMS90, 0.12% of Irganox B225 and 0.09% of Na benzoate.

Moreover, the said comparison composition contains 16% by weight of fraction soluble in xylene, having an intrinsic viscosity value of 2.58 dl/g, and has the following features:
(mmmm) of the xylene-insoluble portion of (A): 99.1% molar;
Mw/Mn of (A):10.1;
Mz/Mw of (A): 3.5.

TABLE 1

| | | 1st reactor | 2nd reactor | 3rd reactor |
|---|---|---|---|---|
| POLYMERIZATION | | | | |
| Temperature | ° C. | 70 | 70 | 80 |
| Pressure | barg | 40 | 40 | 18 |
| Residence time | min | 55 | 44 | 25 |
| $H_2$ bulk | mol ppm | 7426 | 6990 | — |
| $C_2^-/C_2^- + C_3^-$ | % | — | — | 0.28 |
| $H_2/C_2^-$ | % | — | — | 0.062 |
| Split | wt % | 64 | 17 | 19 |
| POLYMER ANALYSES | | | | |
| MIL | dg/min | 49.5 | 50.2 | 21 |
| PI of component (A) | — | — | 6 | — |
| Copolymerized $C_2^-$ (total) | wt % | — | — | 8.4 |
| Xylene soluble I.V. (total) | dl/g | — | — | 2.86 |
| Xylene insolubles | wt % | 98.2 | 97.6 | 82.2 |
| X.I. (mmmm) in (A) | molar % | | 98.8 | |
| Mw/Mn of (A) | | | 15.1 | |
| Mz/Mw of (A) | | | 4.7 | |
| Y | wt % | | | 8.2 |

TABLE 1-continued

|  |  | 1st reactor | 2nd reactor | 3rd reactor |
|---|---|---|---|---|
| X | wt % |  |  | 41.2 |
| Copolymerized $C_2^-$ in (B) | wt % | — | — | 45 |

Notes:
$H_2$ bulk = hydrogen concentration in the liquid monomer;
$C_2^-$ = ethylene;
$C_3^-$ = propylene;
Split = amount of polymer prepared in the concerned reactor, referred to the total weight;
total = referred to the whole polymer composition;
I.V. = Intrinsic Viscosity;
X.I. (mmmm) = content of isotactic pentads in the fraction of (A) insoluble in xylene at 25° C.

TABLE 2

| Polymer of Ex. | 1 (nucleated) | Comp. 1 (nucleated) | Comp. 2 (nucleated) |
|---|---|---|---|
| MFR (g/10') | 21 | 21.3 | 21 |
| PI (A) | 6 | 4.3 | 4.3 |
| Flexural Modulus (MPa) | 1544 | 1510 | 1426 |
| Izod at 23° C. (kJ/m$^2$) | 6.6 | 6 | 5.9 |
| Izod at 0° C. (kJ/m$^2$) | 5.2 | 3.8 | 4.6 |
| Izod at −10° C. (kJ/m$^2$) | 5 | 3.6 | 4.5 |
| Izod at −20° C. (kJ/m$^2$) | 4.4 | 3.8 | 4.4 |
| Break Energy at −20° C. (J) | 14.1 | 13.1 | 13.8 |
| D/B (° C.) | <−50 | −47 | <−50 |

Notes:
D/B = Ductile/Brittle transition temperature.

The invention claimed is:

1. An olefin polymer composition comprising:
   (A) 60-95% by weight of a propylene homopolymer, or a copolymer of propylene containing 3% or less by weight of ethylene or at least one $C_4$-$C_{10}$ α-olefin, or combinations thereof, said homopolymer or copolymer having a Polydispersity Index value of from 4.6 to 10 and a content of isotactic pentads higher than 98 molar measured by $^{13}C$ NMR on a fraction insoluble in xylene at 25° C.;
   (B) 5-40% by weight of a copolymer of ethylene containing from 40% to 70% by weight of propylene or at least one $C_4$-$C_{10}$ α-olefin, or combinations thereof;
said composition having a Temperature Rising Elution Fractionation profile, obtained by fractionating said composition in xylene into fractions and collecting at least one fraction at temperatures of 40° C., 80° C. and 90° C.; said weight percent of ethylene content Y of said fraction collected at 90° C. satisfies the following relation (I):

$$Y \leq -0.8 + 0.035X + 0.0091X^2$$

wherein X is a weight percent of said ethylene content of said fraction collected at 40° C., and said fraction soluble in xylene at 25° C. has an intrinsic viscosity [η] from 1.8 to 4.2 dl/g.

2. The composition of claim 1, wherein component (A) has a molecular weight distribution, expressed in a Mw/Mn ratio equal to or higher than 7, and a Mz/Mw ratio equal to or higher than 3.6.

3. A polymerization process for preparing the olefin polymer composition of claim 1, comprising preparing components (A) and (B) in at least two separate subsequent steps.

4. The polymerization process of claim 3, further comprising a Ziegler-Natta polymerization catalyst comprising a solid catalyst component comprising:
   a) Mg, Ti, and a halogen, and an electron donor selected from succinates of formula (I) below:

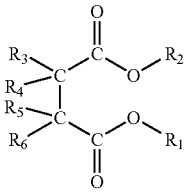

wherein $R_1$ and $R_2$ are equal, or are different from each other, and are selected from a $C_1$-$C_{20}$ linear or branched alkyl, alkenyl, cycloalkyl, aryl, arylalkyl and alkylaryl group, optionally containing heteroatoms; $R_3$ to $R_6$ are equal, or are different from each other, and are selected from hydrogen and a $C_1$-$C_{20}$ linear or branched alkyl, alkenyl, cycloalkyl, aryl, arylalkyl and alkylaryl group, optionally containing heteroatoms; with the proviso that when $R_3$ to $R_5$ are contemporaneously hydrogen, $R_6$ is selected from a primary branched, a secondary, and a tertiary alkyl, cycloalkyl, aryl, arylalkyl, and alkylaryl group having from 3 to 20 carbon atoms, and a linear alkyl group having at least four carbon atoms optionally containing heteroatoms; and
   b) an alkylaluminum compound.

5. The olefin polymer composition of claim 1, wherein component (B) further comprises a diene.

6. The polymerization process of claim 4, further comprising at least one external electron donor compound.

7. The polymerization process of claim 4, wherein at least two of $R_3$ to $R_6$ form a cyclic ring.

* * * * *